United States Patent
Lu et al.

(10) Patent No.: US 10,164,640 B1
(45) Date of Patent: Dec. 25, 2018

(54) METHOD AND DEVICE TO SPEED-UP LEAKAGE BASED PUF GENERATORS UNDER EXTREME OPERATION CONDITIONS

(71) Applicant: Taiwan Semiconductor Manufacturing Co., Ltd., Hsin-Chu (TW)

(72) Inventors: Shih-Lien Linus Lu, Hsinchu (TW); Cheng-En Lee, Hsin-Chu (TW); Jui-Che Tsai, Tainan (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 16/004,209

(22) Filed: Jun. 8, 2018

(51) Int. Cl.
*H03K 19/003* (2006.01)
*H03K 19/177* (2006.01)
*G06F 21/72* (2013.01)
*H04L 9/32* (2006.01)
*G11C 16/22* (2006.01)
*G06F 12/14* (2006.01)

(52) U.S. Cl.
CPC ... *H03K 19/17768* (2013.01); *G06F 12/1408* (2013.01); *G06F 21/72* (2013.01); *G11C 16/22* (2013.01); *H04L 9/3278* (2013.01)

(58) Field of Classification Search
CPC .......... H03K 19/17768; G06F 12/1408; G06F 21/72; G11C 16/22; H04L 9/3278

USPC ............................................................. 326/8
See application file for complete search history.

(56) References Cited

U.S. PATENT DOCUMENTS

| | | | |
|---|---|---|---|
| 9,966,954 B1* | 5/2018 | Yang | H03K 19/00315 |
| 2012/0106235 A1* | 5/2012 | Christensen | G11C 11/4091 365/149 |
| 2016/0285639 A1* | 9/2016 | Mathew | H04L 9/3278 |
| 2017/0180140 A1* | 6/2017 | Mai | G06F 21/73 |

* cited by examiner

*Primary Examiner* — Daniel D Chang
(74) *Attorney, Agent, or Firm* — Duana Morris LLP

(57) ABSTRACT

Disclosed is a physical unclonable function generator circuit and method. In one embodiment, a physical unclonable function (PUF) generator includes: a PUF cell array comprising a plurality of bit cells, wherein each of the plurality of bit cells comprises at least two inverters, at least one floating capacitor, at least two dynamic nodes, wherein the at least one floating capacitor is coupled between a first inverter at a first dynamic node and a second inverter at a second dynamic node; a PUF controller coupled to the PUF cell array, wherein the PUF controller is configured to charge the first dynamic nodes through the respective first inverters in the plurality of bit cells; and a finite state machine coupled to the PUF cell array configured to determine voltage levels on the second dynamic nodes through the respective second inverters in the plurality of bit cells to determine first logical states of the plurality of bit cells at at least one sampling time and generate a PUF signature.

20 Claims, 7 Drawing Sheets

| Bit cell # | Temperature / Bit voltage | | | | | | |
|---|---|---|---|---|---|---|---|
| | 125°C / 0.6V | -40°C / 0.6V | 125°C / 0.9V | -40°C / 0.9V | 125°C / 1.2V | -40°C / 1.2V |
| 1 | 0 | 0 | 0 | 0 | 0 | 0 |
| 2 | 1 | 1 | 1 | 1 | 1 | 1 |
| 3 | 1 | 1 | 1 | 1 | 1 | 1 |
| 4 | 1 | 1 | 1 | 0 | 1 | 1 |
| 5 | 1 | 0 | 0 | 1 | 0 | 1 |
| 6 | 0 | 1 | 1 | 0 | 1 | 0 |
| 7 | 1 | 0 | 0 | 1 | 0 | 1 |
| 8 | 0 | 0 | 0 | 0 | 0 | 0 |
| 9 | 1 | 0 | 0 | 0 | 0 | 1 |
| 10 | 0 | 0 | 0 | 0 | 0 | 0 |
| 11 | 0 | 0 | 0 | 0 | 0 | 0 |
| 12 | 0 | 0 | 0 | 0 | 0 | 0 |
| 13 | 0 | 0 | 0 | 0 | 0 | 0 |
| 14 | 0 | 0 | 0 | 1 | 0 | 0 |
| 15 | 1 | 1 | 1 | 1 | 1 | 1 |
| 16 | 1 | 1 | 1 | 1 | 1 | 1 |

FIG. 7

METHOD AND DEVICE TO SPEED-UP LEAKAGE BASED PUF GENERATORS UNDER EXTREME OPERATION CONDITIONS

BACKGROUND

With the increasing use of integrated circuits in electronic devices that provide different types of information for a variety of different applications, there has been an increasing need to adequately protect sensitive and/or critical information that may be stored within an electronic device to limit access to such information to only other devices that have permission to access the information. A physically unclonable function (PUF) generator is a physical structure generally within an integrated circuit that provides a number of corresponding outputs (e.g., responses) in response to inputs (e.g., challenges) to the PUF generator. There are many different implementation approaches including delay-chain-based PUF generators and memory-based PUF generators. A memory-based PUF generator translates the variations in an array of memory devices, typically either SRAM (static random-access memory) or DRAM (dynamic random-access memory) devices, into a binary sequence. Both methods are based on randomness in physical properties among devices caused by inherent variations in a semiconductor manufacturing process, e.g., geometric dimension and doping concentration.

A leakage-based DRAM PUF generator is reliable and cost effective. However, when a leakage current of such device is dominated by a temperature-dependent sub-threshold current, time required to output a PUF signature as well as its reliability become sensitive to the operational conditions (e.g., temperature). Therefore, it is necessary to develop a leakage-based PUF device which can operate in a wide range of temperatures while providing a fast and reliable response.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of illustration.

FIG. 7 illustrates a simulation result from a PUF cell array with 16 bit cells under different operation conditions, in accordance with some embodiments of the present disclosure.

DETAILED DESCRIPTION OF EXEMPLARY EMBODIMENTS

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

A physically unclonable function (PUF) generator is generally used for authentication and secret key storage without requiring secure electrically erasable programmable read-only memory (EEPROMs) and/or other expensive hardware (e.g., battery-backed static random-access memory). Instead of storing a key in a digital memory, a PUF generator derives a key based its unique physical characteristics caused by inherent process variations to differentiate itself from others that are produced even from a same fabrication process. Generally, such key is referred to as a "PUF signature". Variations in a number of parameters can be used to define such a signature such as, for example, gate delay, threshold voltage, power-on state of a SRAM-based device, and/or any of a variety of physical characteristics of an IC. Furthermore, a charge decay (e.g., discharge process) can be also used as a PUF signature, which is typically used in DRAM-based PUF generators. In the present disclosure, a circuit and method using a decay-based CMOS pseudo-DRAM PUF generator comprising a plurality of PUF cells, wherein each of the plurality of bit cells comprises at least two inverters, a floating capacitor and at least two dynamic nodes to generate a PUF signature are presented. Inherent process variations lead to different current leakage pathways in each of the plurality of PUF cells and thus a unique combination of different transient discharge behaviors at pre-charged dynamic nodes. Such current leakage pathways comprise gate leakage current, reverse junction diode leakage current, etc., which allow the operation of such PUF generator under extreme operation conditions with a fast response time. By continuously monitoring the discharge behavior and comparing a voltage value on the second dynamic node through a second inverter at a particular sampling time to a trigger point, an output logic "0" or "1" can be determined for a corresponding bit cell. In one embodiment, when half of the total number (e.g., N) of bit cells in a PUF generator are flipped (i.e., switched from 1 to 0), a PUF signature, an N-bit binary sequence of logic states of all PUF cells at the sampling time, can be obtained.

Figure 1:
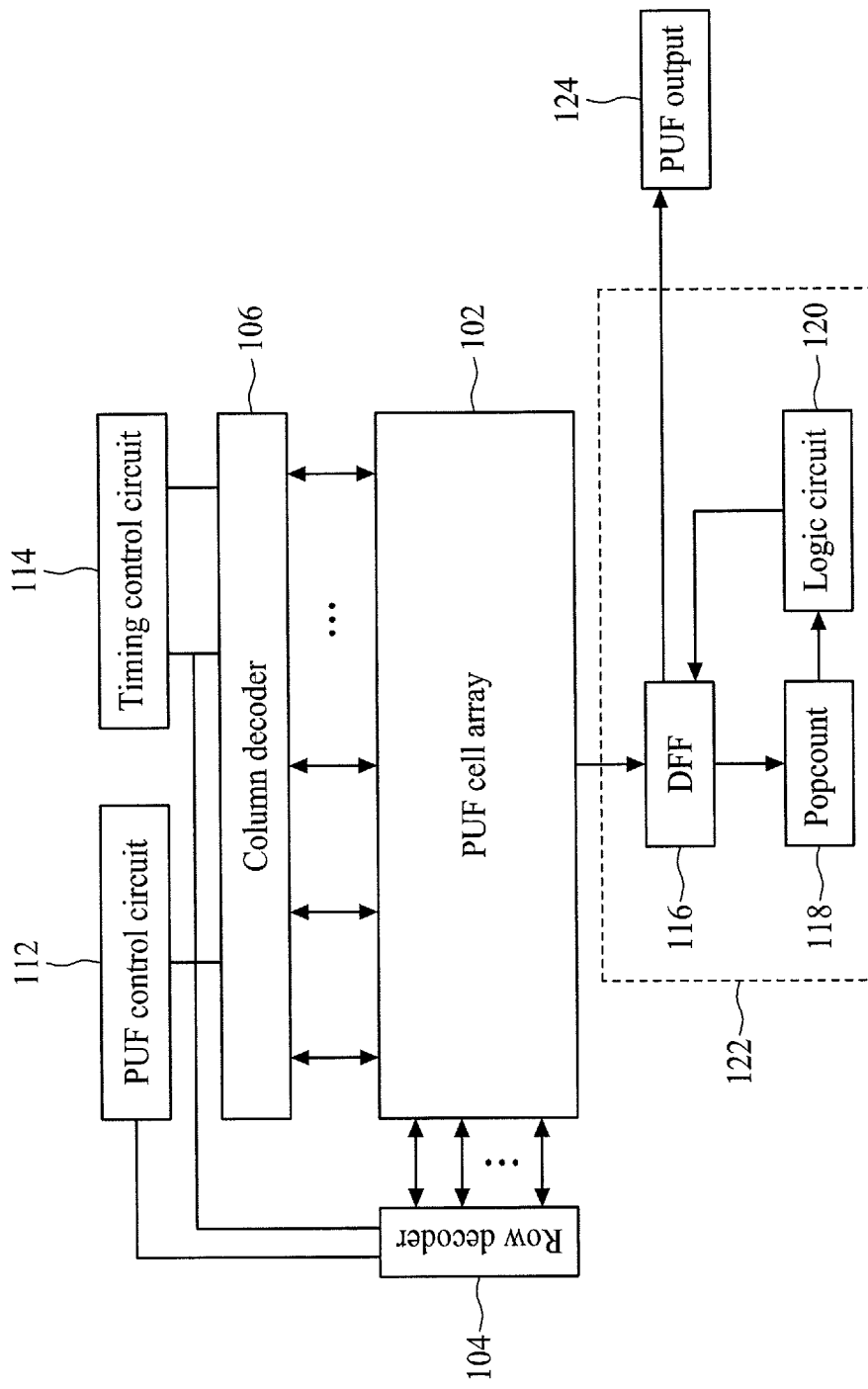
FIG. 1 illustrates an exemplary physical unclonable function (PUF) generator, in accordance with some embodiments of present disclosure.

FIG. 1 illustrates an exemplary physical unclonable function (PUF) generator 100, in accordance with some embodiments of present disclosure. It is noted that the PUF generator 100 is merely an example, and is not intended to limit the present disclosure. Accordingly, it is understood that additional operations may be provided before, during, and after the PUF generator 100 of FIG. 1, and that some other operations may only be briefly described herein. In the illustrated embodiment of FIG. 1, the PUF generator 100 comprises a PUF cell array 102, a row decoder 104, and a column decoder 106, that are coupled to a plurality of bit cells in the PUF cell array 102. The PUF generator 100 further comprises a PUF control circuit 112 and a timing control circuit 114, in the illustrated embodiment. All the components may be coupled to each other and further to the PUF control circuit 112 and the timing control circuit 114.

The PUF cell array 102 includes a plurality of bit cells that are arranged in a column-row configuration in which each column has a bit voltage line and a zero voltage line. More specifically, the bit voltage line and zero voltage line of each column are respectively coupled to a plurality of bit cells that are disposed in that column, and each bit cell in that column is arranged on a different row and coupled to respective (different) word line (WL) and word line bar (WLB). That is, each bit cell of the PUF cell array 102 is coupled to a bit voltage line, a zero voltage line of the column of the PUF cell array 102 and a WL and a WLB of the row of the PUF cell array 102. In some embodiments, the bit voltage lines and zero voltage lines are arranged in parallel vertically and the WL and WLB are arranged in parallel horizontally. An illustrated embodiment of the PUF cell array 102 will be provided in further detail below with reference to FIG. 2. The bit cells of the PUF cell array 102 is implemented as 5-transistor (5T) DRAM (Dynamic Random-Access Memory) bit cells, etc., according to some embodiments of present disclosure. The row decoder 104 is configured to receive a row address of the PUF cell array 102 and to provide a WL at that row address. In some embodiments, the column decoder 106 may be optional. The column decoder 106 is configured to receive a column address of the PUF cell array 102 and to provide a bit line voltage and a zero voltage at that column address.

The PUF control circuit 112 is configured to control (e.g., increase or decrease) a voltage level of a bit line voltage applied at each of the bit cells, control (e.g., increase or decrease) a voltage level applied at each of the WL. In some embodiments, the PUF control circuit 112 may enable the voltage supply to at least one selected column and at least one selected row. In some alternative embodiments, the PUF control circuit 112 may be implemented as a separate block, which is not embedded in the PUF cell array 202. In some embodiments, the PUF control circuit 112 can be embedded in the PUF cell array 102. As described above, in some embodiments, the PUF control circuit 112 is coupled to all the components and configured to control the coupled components. In some embodiments, the timing control circuit 114 provide control and synchronization on pulse signals during read and write processes. In some embodiments, the PUF control circuit 112 and timing control circuit 114 may be coupled to a common data bus for inter-communication.

In some embodiments, the PUF cell array 102 is further coupled to a finite state machine (FSM) 122, wherein the FSM 122 comprises a dynamic flip-flop (DFF) circuit 116, a population counter (Popcount) 118, and an evaluation logic circuit 120. Output terminals of the DFF circuit 116 is then coupled to a Popcount 118. An output terminal of the Popcount 118, which indicates the number of "0" s in an N-bit input, is then connected to the evaluation logic circuit 120. An output terminal of the evaluation logic circuit 120 is electrically coupled to the DFF circuit 116.

A Popcount 118 can be a computer operation using generic algorithms, in certain embodiments, which can be generally realized using software based techniques that span a wide range of algorithms. These algorithms comprise serial shifting, table lookup, arithmetic logic counting, emulated popcount, hamming distance bit vertical counter, frequency division, etc. Alternatively, according to other embodiments, the Popcount 118 can be configured using hardware circuitry. A hardware circuitry for the Popcount 118 can comprise half adders, full adders, Carry Save adders, and etc., with at least one logic gates (XOR, AND, etc.). The number of logic gates and thus the complexity of the Popcount 118 is defined by the number of inputs and thus the number of bit cells in the PUF cell array 102. In some embodiments, the number of logic gates is minimized to minimize delay and minimize number of charges can be implemented to maximize the speed as well as other performance, including cost and number of interconnects. In certain embodiments, the Popcount 118 is a combination of a software and a hardware technique to achieve improved performance.

If a number of inputs of the Popcount 118 with flipped logical states (e.g., switched from low to high, or high to low) at a sampling time is equal to or greater than N/2, the evaluation logic circuit 120 outputs a high level (e.g., logic "1") in accordance with various embodiments. The high level is applied to the DFF circuit 116 through an inverter (not shown). A low level on the DFF 116 from the evaluation logic circuit 120 terminates the sampling process and outputs a PUF output comprising a binary sequence of N-bit logic states of bit cells in the PUF cell array 102 at the sampling time as a PUF output 124. Otherwise, the DFF circuit 116 continues with the sampling process at a different sampling time and the Popcount 118 continues receiving logic states from the DFF circuit 116 until the evaluation logic circuit 120 terminates the sampling process up on detecting at least half of the total number of inputs have flipped logical states.

Figure 2:
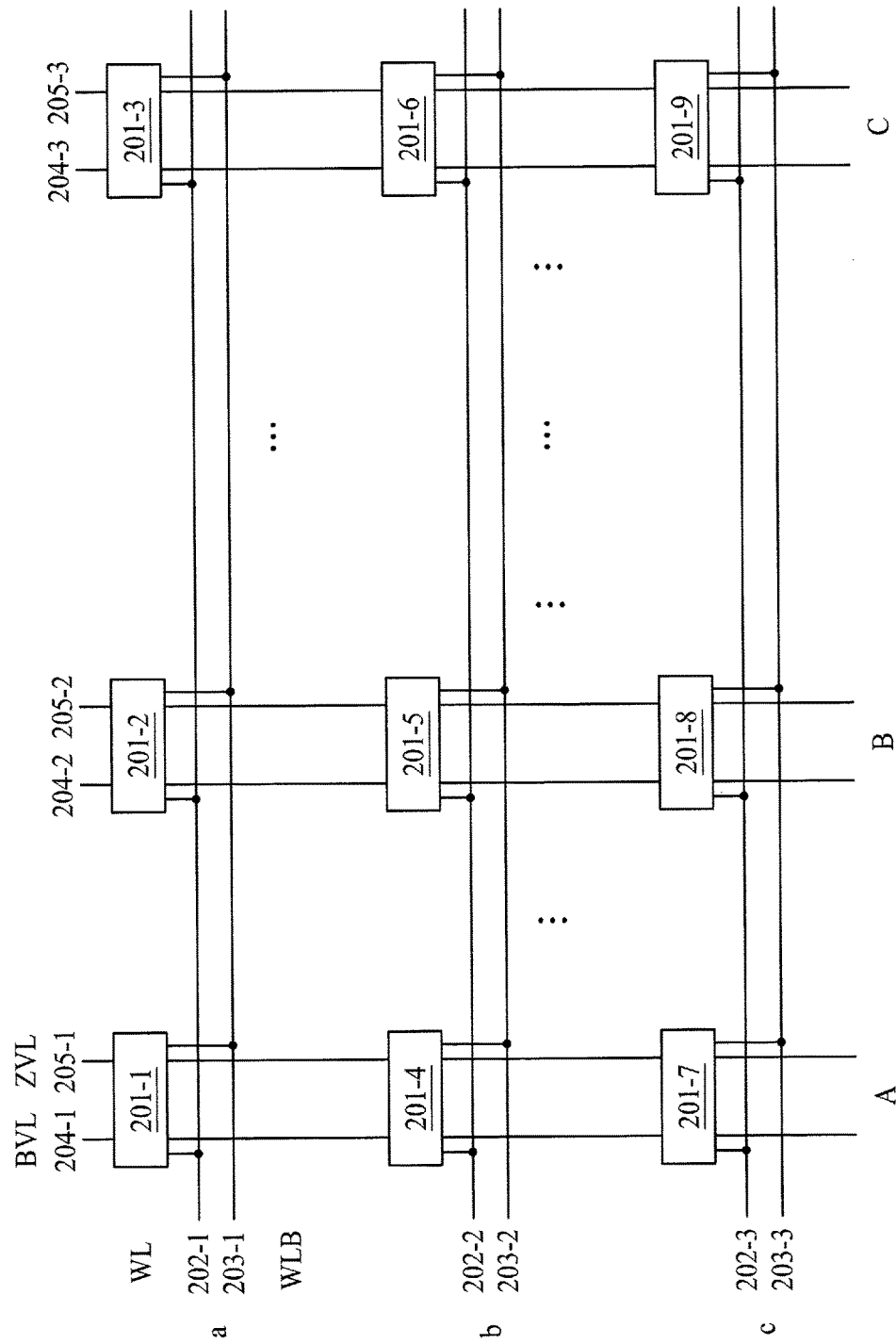
FIG. 2 illustrates an exemplary circuit diagram of a PUF cell array comprising a plurality of bit cells, in accordance with some embodiments of present disclosure.

FIG. 2 illustrates an exemplary circuit diagram of a PUF cell array 102 comprising a plurality of bit cells 201, in accordance with some embodiments of present disclosure. In some embodiments, the PUF cell array 102 includes a plurality of bit cells 201-1, 201-2, 201-3, 201-4, 201-5, 201-6, 201-7, 201-8, and up to 201-9. Although only 9 bit cells are shown, any desired number of bit cells may be included in the PUF cell array 102 while remaining within the scope of the present disclosure. As described above, the bit cells 201-1, 201-2, 201-3, 201-4, 201-5, 201-6, 201-7, 201-8, and 201-9 are arranged in a column-row configuration. More specifically, in some embodiments, the PUF cell array 102 includes word lines (WL's) 202-1, 202-2, and 202-3 arranged in parallel, word line bars (WLB's) 203-1, 203-2, and 203-3, arranged in parallel. In some embodiments, the PUF cell array 102 also includes bit voltage lines (BVL's) 204-1, 204-2, and 204-3 arranged in parallel, and zero voltage lines (ZVL's) 205-1, 205-2, and 205-3 arranged in parallel. The WL's 202 and WLB's 203 are arranged in parallel orthogonally to the BVL's 204 and ZVL's 205. As such, the PUF cell array 202 may include a first plurality of columns (e.g, arranged vertically), a second plurality of rows (e.g., arranged horizontally), wherein each column includes a respective pair of BVL 204, and ZVL 205, and each row includes a respective pair of WL 202 and WLB 203.

For example, as shown in the illustrated embodiment of FIG. 2A, the PUF cell array 202 includes columns "A," "B," and "C," and rows "a," "b," and "c," wherein column A includes respective BVL 204-1 and ZVL 205-1; column B includes respective BVL 204-2, ZVL 205-2; column C includes respective BVL 204-3, ZVL 205-3; row a includes respective WL 202-1 and WLB 203-1; row b includes respective WL 202-2 and WLB 203-2; and row c includes respective WL 202-3 and WLB 203-3.

Moreover, each column includes one or more bit cells 201 that are each coupled to the column's respective BVL 204 and ZVL 205, and different separate WL 202 and WLB 203.

For example, column A includes bit cells 201-1, 201-4, and 201-7, wherein the bit cells 201-1, 201-4, and 201-7 are each coupled to the BVL 204-1, ZVL 205-1, WL's 202-1, 202-2, and 202-3, and WLB 203-1, 203-2, and 203-3, respectively; column B includes bit cells 201-2, 201-5, and 201-8, wherein the bit cells 201-2, 201-5, and 201-8 are each coupled to the BVL 204-2, ZVL 205-2, WL's 202-1, 202-2, and 202-3, and WLB 203-1, 203-2, and 203-3, respectively; and column C includes bit cells 201-3, 201-6, and 201-9, wherein the bit cells 201-3, 201-6, and 201-9 are each coupled to the BVL 204-3, ZVL 205-3, WL's 202-1, 202-2, and 202-3, and WLB 203-1, 203-2, and 203-3, respectively. It should be noted the PUF cell array 202 is merely an example is not intend to be limiting. Accordingly, additional or different signal lines can be used in the PUF cell array 102 of FIG. 2 depending on the type of bit cells and PUF generation technologies used in the PUF cell array 102. Furthermore, the signal lines (i.e., WL 202, WLB 203, BVL 204, and ZVL 205 in the illustrated embodiment) can be arranged differently according to the fabrication technology and circuit layouts, which are within the scope of the present disclosure.

As described above, each bit cell of the PUF cell array 102 (e.g., 201-1, 201-2, 201-3, 201-4, 201-5, 201-6, 201-7, 201-8, 201-9, etc.) may include a plurality of transistors (e.g., 5T-DRAM). In some embodiments, a logical state stored in each bit cell may be written to the bit cell by applying either a high state (i.e., a logical "1") or a low state (i.e., a logical "0") through a corresponding WL 202. In some embodiments, a logical state in each bit cell can be read to the DFF circuit 116 through a corresponding WLB 203.

Figure 3:
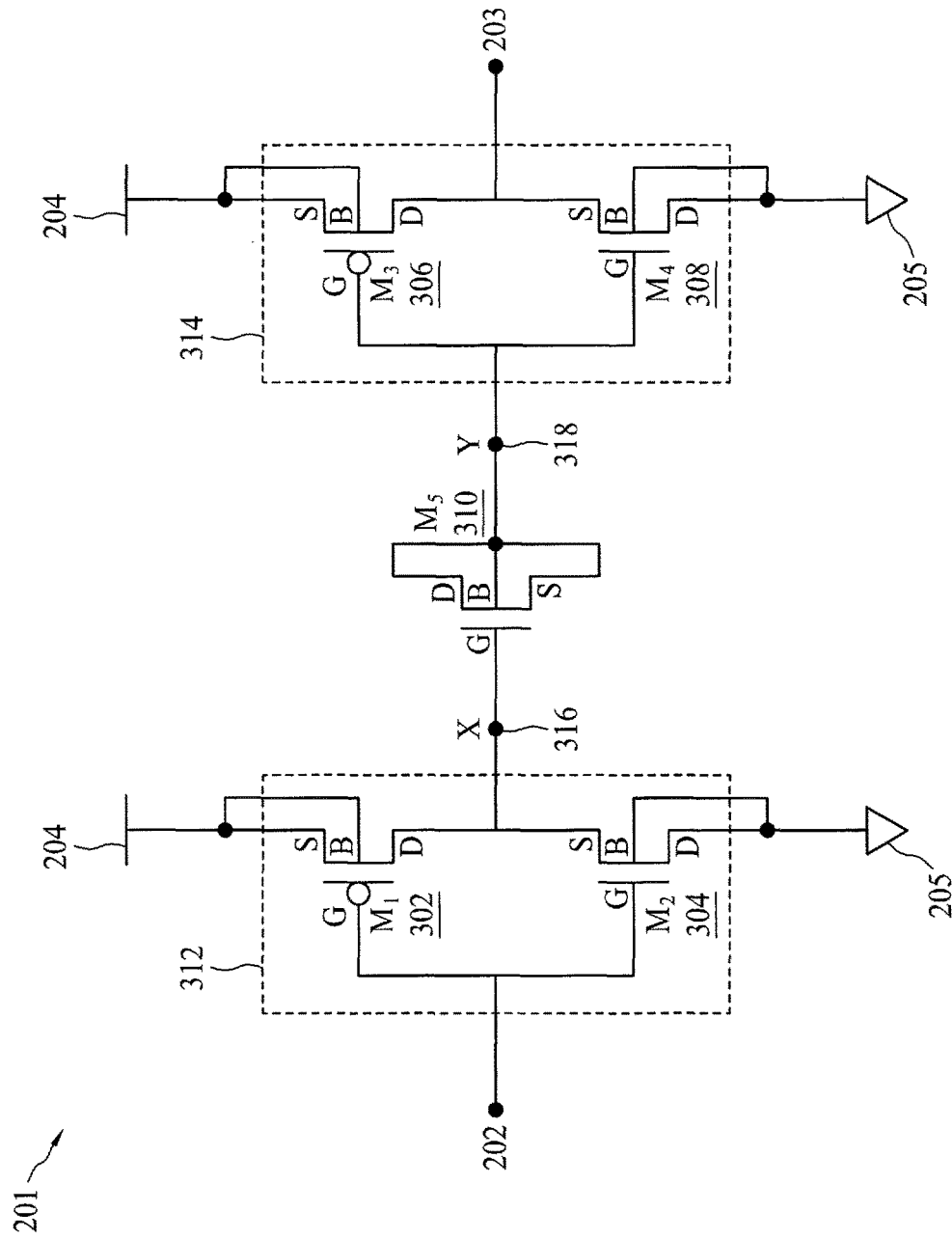
FIG. 3 illustrates an exemplary circuit diagram of a bit cell of a PUF cell array, in accordance with some embodiments of present disclosure.

FIG. 3 illustrates an exemplary circuit diagram of a bit cell 201 of a PUF cell array 102, in accordance with some embodiments of present disclosure. The PUF cell 201 comprises 3 NMOS transistors (i.e., M2 304, M4 308, and M5 310) and 2 PMOS transistor (i.e., M1 302 and M3 306). Source terminal of a first NMOS transistors M2 304 (304-S) is coupled to drain terminal of a first PMOS transistor M1 302 (302-D), which are further coupled to a first dynamic node 316. Source and body terminals of the first PMOS transistor (302-S and 302-B) are coupled to a BVL 204. Drain and body terminal of the first NMOS transistor M2 304 (304-D and 304-B) are coupled to a ZVL 205. Gate terminals of the first NMOS and first PMOS transistors M2 304 and M1 302 (304-G and 302-G) are coupled together and further coupled to a WL 202. The first NMOS transistor M2 304 and the first PMOS transistor M1 302 are coupled to foam a first inverter 312.

Similarly, a second PMOS transistor M3 306 and a second NMOS transistor M4 308 are connected to form a second inverter 314. Specifically, source terminal of a second NMOS transistors M4 308 (308-S) is coupled to drain terminal of a second PMOS transistor M3 306 (306-D), which are further coupled to a WLB 203. Source and body terminals of the second PMOS transistor (306-S and 306-B) are coupled to the BVL 204. Drain and body terminal of the second NMOS transistor M4 308 (308-D and 308-B) are coupled to the ZVL 205. Gate terminals of the second NMOS and second PMOS transistors M4 308 and M3 306 (308-G and 306-G) are coupled together and further coupled to a second dynamic node 318.

The first dynamic node 316 is then coupled to gate terminal of a third NMOS transistor M5 310 (310-G). Source, drain and body terminals of the third NMOS transistor M5 310 (310-S, 310-D, and 310-G) are coupled together to the second dynamic node 318. In some other embodiments, between the first and the second dynamic nodes 316 and 318, there can comprise a plurality of NMOS transistors, each of which has coupled source, drain and body terminals to behave as a capacitor. In some embodiments, the plurality of NMOS transistors between the first and second dynamic nodes are coupled together in parallel.

Figure 4:
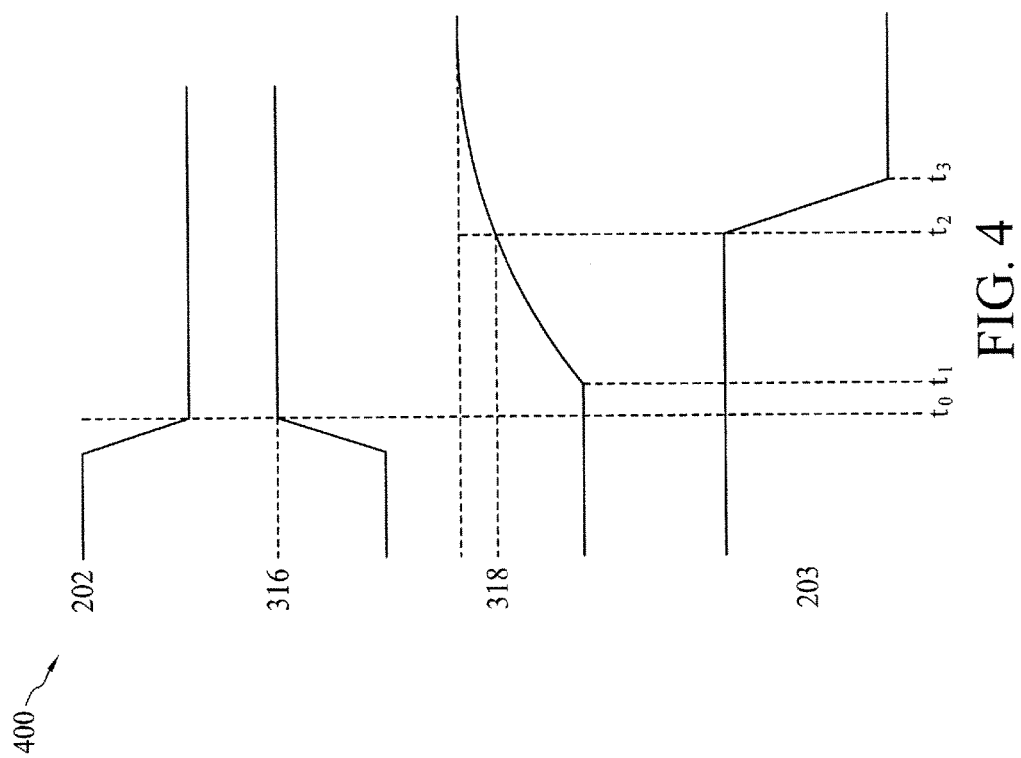
FIG. 4 illustrates exemplary signals on first and second dynamic nodes and a word line bar (WLB) in response to an input on a word line (WL) of a bit cell, in accordance with some embodiments of present disclosure.

FIG. 4 illustrates exemplary signals 400 on first and second dynamic nodes 316/318 and a word line bar (WLB) 203 in response to an input on a word line (WL) 202 of a bit cell 201, in accordance with some embodiments of present disclosure. In some embodiments, the first and the second dynamic nodes 316 and 318 are previously discharged at low voltages (i.e., $V_{SS}$) with logical states "0". The low voltage on the second dynamic node 318 turns on the second PMOS transistor M3 306 and turns off the second NMOS transistor M4 308 in the second inverter 314, which pulls up the voltage on the drain terminal of the second PMOS transistor M3 306 to the voltage level on the BVL 204 (i.e., $V_{DD}$) with a logical state "1" on as the output of the bit cell 201.

In some embodiments, the WL 202 receives a signal switching from a high voltage level to a low voltage level at time to. This low voltage on the WL 202 turns on the first PMOS transistor M1 302 and turns off the first NMOS transistor M2 304 in the first inverter 312, which pulls up the voltage on the drain terminal of the first PMOS transistor M1 302 and the first dynamic node 316 is then directly coupled to the voltage level on the BVL 204 (i.e., $V_{DD}$). Ideally, since a second plate (310-D, 310-S and 310-B) of the capacitor M5 310 is coupled to gate terminals of the second PMOS and second NMOS transistors M3 306 and M4 308 in the second inverter 314 and thus floating, the capacitor behaves as an open circuit, which does not allow current to flow in order to charge the capacitor. Therefore, when a high voltage is applied on a first plate of the capacitor M5 310 through the first dynamic node 316 at time t0, the voltage level on the first dynamic node 316 increases to $V_{DD}$ without going through a transient time. Meanwhile, a charge coupling or charge sharing mechanism in the capacitor with a floating plate allows the voltage on the second plate of the capacitor starting to increase at time t1 with the increasing voltage on the first plate. In some embodiments, the charge coupling is a function of the capacitance of the capacitor, which is further determined by the dielectric constant of the insulating material, the thickness and size of the gate.

In some embodiments, the second plate of the capacitor is practically not floating. There are parallel and series resistance in the capacitor primarily caused by gate leakage current caused by tunneling of electrons through a thin gate oxide in the third NMOS transistor M3 310 which is configured as a capacitor. This tunneling may include Fowler-Nordheim tunneling and direct tunneling, wherein the direct tunneling may further include electron tunneling in the conduction band, electron tunneling in the valence band, and hole tunneling in the valence band. In some embodiments, direct tunneling is the dominant source of leakage current, which depends exponentially on the gate insulator thickness, the area of the gate insulator, and the voltage across the gate insulator, and has negligible dependence on temperature.

In some embodiments, after the onset of the increasing voltage on the second dynamic node 318 caused by the charge coupling at time t1, the leakage current in the capacitor starts to further charge the second dynamic node 316, resulting in a continuously increasing voltage level on the second dynamic node 316. In some embodiments, when the voltage level on the second dynamic node 316 becomes high enough to turn off the second PMOS transistor M3 306 and further turn on the second NMOS transistor M4 308 at time t2, the voltage level on the WLB 203 is further pulled down from $V_{DD}$ to $V_{SS}$ at time t3, thus a flip of its logical state from 1 to 0. In some embodiments, the time it takes for the second inverter 314 to switch is determined by the input/output transfer curve of the second inverter 314, which is further determined by temperature, doping concentration, operational voltage, etc. The total time for each bit cell 201 in the PUF cell array 102 is determined by charge coupling in the third NMOS transistor 310 (t140), charging of the second dynamic node 318 by a leakage current in the third NMOS transistor 310 (t2-t1), and input/output transfer curve of the second inverter 314 (t3-t2), resulting in different time required for each of the bit cells 201 in the PUF cell array to flip.

Figure 5:
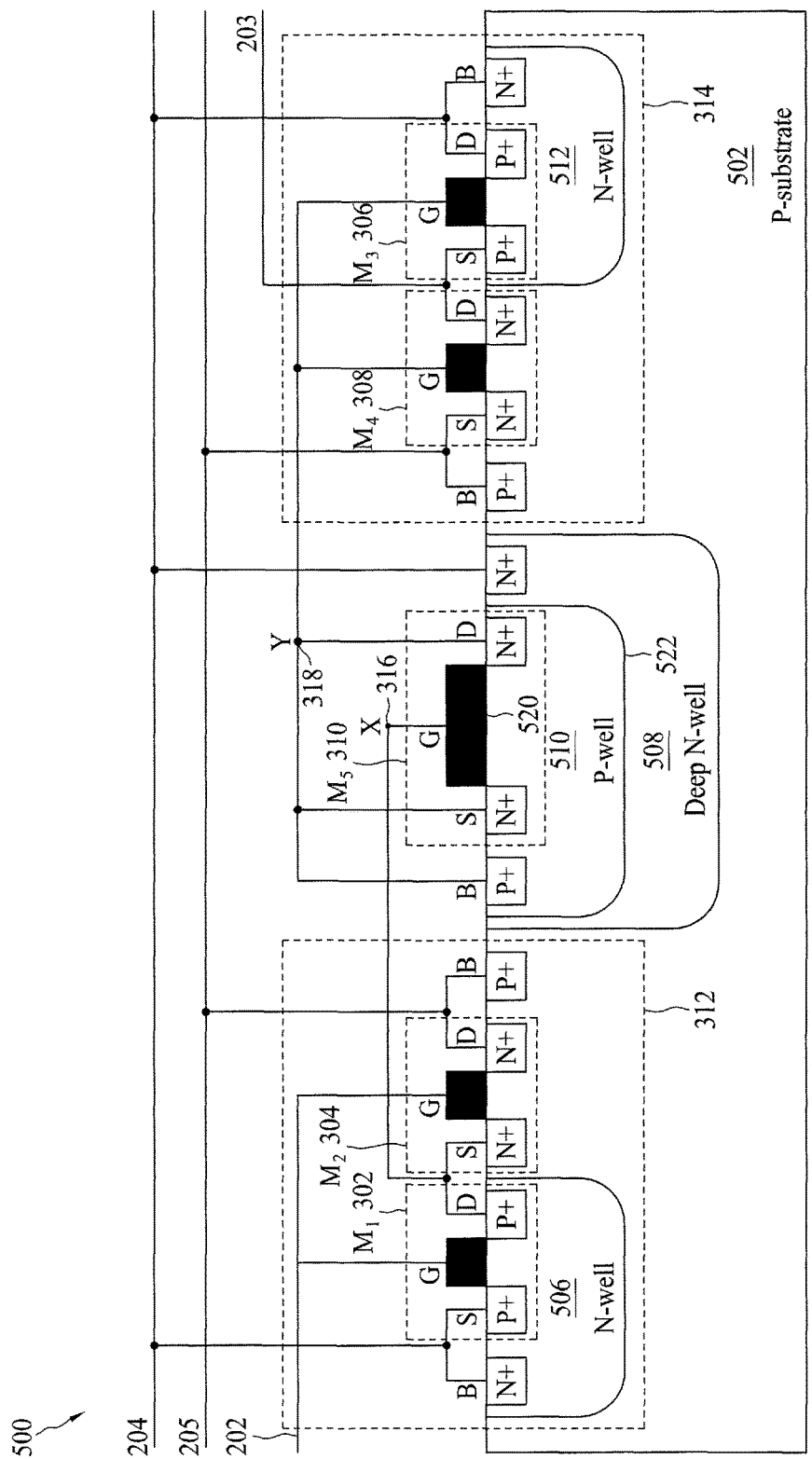
FIG. 5 illustrates a cross-sectional view of a portion of a semiconductor device showing one bit cell, in accordance with some embodiments of the present disclosure.

FIG. 5 illustrates a cross-sectional view of a portion of a semiconductor device 500 showing one bit-cell 201 of FIG. 3, in accordance with some embodiments of the present disclosure. The semiconductor device 500 may be included in a microprocessor, memory cell, and/or other integrated circuit (IC). Also, FIG. 5 is simplified for a better understanding of the concepts of the present disclosure. Although the figures illustrate the semiconductor device 500, it is understood the device 500 may comprise a number of other bit cells and devices such as resistors, capacitors, inductors, fuses, interconnection metallic layers, vias structures, and insulating layers etc., which are not shown in FIG. 5, for purposes of clarity of illustration.

In some embodiments, the substrate 502 includes a silicon substrate. Alternatively, the substrate 502 may include other elementary semiconductor material such as, for example, germanium. The substrate 502 may also include a compound semiconductor such as silicon carbide, gallium arsenic, indium arsenide, and indium phosphide. The substrate 502 may include an alloy semiconductor such as silicon germanium, silicon germanium carbide, gallium arsenic phosphide, and gallium indium phosphide. In one embodiment, the substrate 502 includes an epitaxial layer. For example, the substrate 502 may have an epitaxial layer overlying a bulk semiconductor. Furthermore, the substrate 502 may include a semiconductor-on-insulator (SOI) structure. For example, the substrate 502 may include a buried oxide (BOX) layer formed by a process such as separation by implanted oxygen (SIMOX) or other suitable technique, such as wafer bonding and grinding. In some embodiments, the substrate 502 is a p-type substrate.

In some embodiments, the semiconductor device 500 can be manufactured using conventional CMOS (complementary metal-oxide-semiconductor) process steps, including patterning using photolithography, deposition of a dielectric layer, etching of the dielectric layer, chemical-mechanical planarization (CMP) process, formation of a gate oxide layer, doping of the substrate, deposition of conductive layers, annealing, patterning metal contacts, formation of ohmic contact silicide, deposition of barrier layers, formation of via structures and interconnections metal lines, and a combination thereof. These processes can be performed by different techniques known to one skilled in the art.

As shown in the illustrated embodiment, a first and a second NMOS transistors M2 304 and M4 308 are directly formed in the p-type substrate 502 by fabricating source and drain terminals directly in the substrate 502 using heavily doped N+ regions and body terminals are the substrate 502 itself by forming an ohmic contact using heavily doped P+ regions. A first and a second PMOS transistors M1 302 and M3 306 are formed in a first and a second N-wells 506 and 512 in the p-type substrate 502, respectively. Source and drain terminals of the first and the second PMOS transistors M1 302 and M3 306 are formed in the N-wells 506 and 512 using heavily doped P+ regions and body terminals are the respective N-wells using heavily doped N+ regions. The first NMOS transistor M2 304 and the first PMOS transistor 302 are coupled together to form a first inverter 312 with detailed connections as described in FIG. 3. Similarly, the second NMOS transistor M4 308 and the second PMOS transistor 306 are coupled together to form a second inverter 314 with detailed connections as described in FIG. 3.

In the illustrated embodiment, a third NMOS transistor M5 310 configured as a floating capacitor can be also fabricated using the same conventional CMOS processes in the substrate 502. In some embodiments, the third NMOS transistor M5 310 is fabricated using a twin-well process. Specifically, source and drain terminals of the third NMOS transistor M5 310 is fabricated in a P-well 510, which is fabricated in a third N-well 508 in the substrate 502 using heavily doped N+ regions. In some embodiments, the third N-well 508 is a deep N-well structure. Body terminal is the P-well 510 through a heavily doped P+ region. The third NMOS transistor M5 310 is coupled to the first and the second inverter 312 and 314 as well as the BVL 204 and ZVL 205 with detailed connections as described in FIG. 3. Further, the third N-well 508 is coupled to the BVL 204 through a heavily doped N+ region, which is used for isolation.

In the illustrated embodiment, a leakage current in the third NMOS transistor M5 310 configured as a floating capacitor mainly comprises two pathways including a gate leakage current through a gate insulator 520 as discussed above in FIG. 4 and a reverse junction leakage current at the interface 522 between the P-well 510 and the third N-well 508. Since the source, drain and body terminals of the third NMOS transistor M5 310 are coupled together to the second dynamic node 316, the reverse junction leakage current eventually leads to a leakage current directly from the BVL 204 (i.e., $V_{DD}$) to the second dynamic node 316. In some embodiments, the gate insulator 520 in the third NMOS transistor M5 310 configured as a floating capacitor is configured larger than gate terminals of the transistors in the first and second inverters 312 and 314. In some embodiments, the third NMOS transistor M5 310 has a larger channel dimensions (width and length) than the transistors in the two inverters 312 and 314 in order to achieve higher leakage current for faster charging of the second dynamic node. In some embodiments, the gate insulator 520 in the third NMOS transistor M5 310 configured as a floating capacitor has a thickness of 3-4 nanometers. The thickness of the gate insulator 520 can be varied and controlled by the desired capacitance value, which is a function of the dielectric constant of the dielectric material of the gate insulator 520 and an operational voltage. In some embodiments, the gate insulator 520 in the third NMOS transistor M5 310 configured as a floating capacitor comprises various insulating materials such as, for example $SiO_2$, $Al_2O_3$, $HfO_2$, $SiO_2$, $La_2O_3$, $ZrO_3$, Ba—Sr—Ti—O, $Si_3N_4$ and laminate of a mixture thereof. In some embodiments, the gate insulator 520 in the third NMOS transistor M5 310 configured as a floating capacitor comprises a high dielectric constant, e.g., a high-k dielectric material. In some embodiments, the gate insulator 520 in the third NMOS transistor M5 310 configured as a floating capacitor can be formed by various processes including deposition of the fourth dielectric layer using PVD (physical vapor deposition), CVD (chemical vapor deposition), ALD (atomic layer deposition) and the like, photolithography and a dry/wet etching process. In some embodiments, this reverse junction leakage current is temperature dependent. As discussed above, the gate leakage current is less dependent on the temperature compared to the reverse junction leakage current, which can be used to speed up the PUF cell latency even at very low temperature where the reverse junction leakage is practically negligible.

Figure 6:
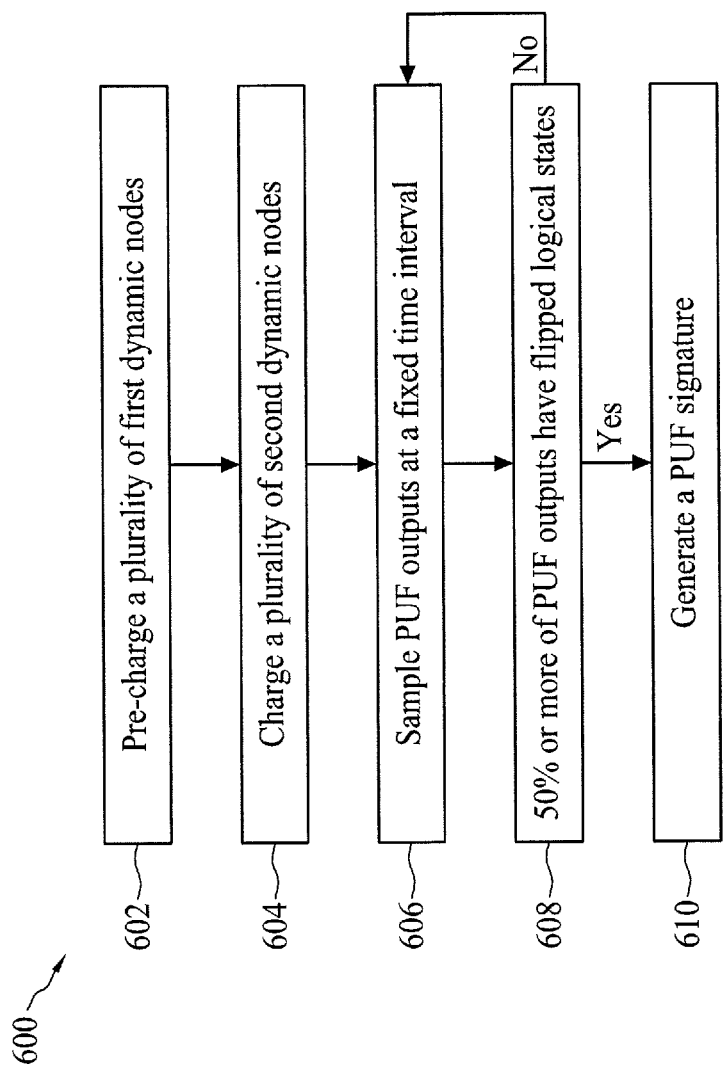
FIG. 6 illustrates a flowchart of a method to generate a PUF signature using a PUF generator, in accordance with various embodiments of present disclosure.

FIG. 6 illustrates a flowchart of a method 600 to generate a PUF signature using a PUF generator 100, in accordance with various embodiments of present disclosure. In various embodiments, the operations of method 600 are performed by the respective components illustrated in FIGS. 1-3 and 5, in accordance with various embodiments. For the purpose of a discussion, the following embodiment of the method 600 will be described in conjunction with FIGS. 1-3 and 5. The illustrated embodiment of the method 600 is merely an example. Therefore, it should be understood that any of a variety of operations may be omitted, re-sequenced, and/or added while remaining within the scope of the present disclosure.

The method 600 starts with operation 602 in which a plurality of first dynamic nodes of a plurality of bit cells are charged, in accordance with various embodiments. Applying a low level on WL 202 turns off a plurality of first NMOS transistors in a plurality of first inverters and turns on a plurality of first PMOS transistors in a plurality of first inverters, which then pulls up the plurality of first dynamic nodes to high levels so as to the plurality of first dynamic nodes to be written with logic "1". Similarly, in order to charge the plurality of first dynamic nodes of the plurality of bit cells in the PUF cell array, a high level on the WL 202 is applied to turn on the plurality of first NMOS transistors and turn off the plurality of first PMOS transistors in the plurality of first inverters, which then pulls down the plurality of first dynamic nodes to low levels to write logic "0".

The method 600 continues to operation 602 in which a plurality of second dynamic nodes are charged. In some embodiments, each of the plurality of first dynamic nodes and each of the plurality of second dynamic nodes are coupled together through an NMOS transistor configured as a capacitor by coupling source, drain and body terminals together. Further, each of the plurality of capacitors has a floating plate (the second dynamic nodes), which is coupled a second inverter. The capacitor with a floating plate will be also charged following the charging of the first dynamic nodes due to a charge sharing effect in a floating capacitor. Further, the plurality of second dynamic nodes are further charged due to leakage current, such as for example, gate oxide leakage current and reverse junction diode leakage current.

The method 600 continues with operation 606 in which logical states of the plurality of bit cells are sampled at a fixed time interval. As described above, a plurality of DFF circuits corresponding to the plurality of PUF cells may be used to perform the sampling, as shown and discussed in FIGS. 1A-1E and 2. The transient discharge behaviors associated with the plurality of second dynamic nodes in the plurality of bit cells are caused by leakage current on corresponding third NMOS transistors configured as a floating capacitor, including reverse junction diode leakage and gate oxide leakage current. Once the voltage level on the plurality of second dynamic nodes become high enough if the plurality of first dynamic nodes are charged to high levels, a plurality of second PMOS transistors are turned off and a plurality of second NMOS transistors are turned on, which then pulls down the voltage level on a plurality of WLB's to low levels. Similarly, once the voltage levels on the plurality of second dynamic nodes become low enough if the plurality of first dynamic nodes are charged to low levels, the plurality of second PMOS transistors are turned on and the plurality of second NMOS transistors are turned off, which then pulls up the voltage levels on the plurality of WLB's to high levels. The pulling down or up of the voltage levels on the WLB's results in the flip of logical states on the output of the plurality of bit cells.

Further, inherent process variations result in variations of discharge behavior at the plurality of dynamic nodes. When a clock signal switches from a low to a high level, voltage values at the plurality of WLB's of bit cells are sampled and compared to trigger points defined by the corresponding DFF circuits. A logic "1" is generated if the voltage value on the WLB is higher than the trigger point, and similarly, its logical state is flipped and a logic "0" is generated if the voltage value drops below the trigger point.

The method 600 continues with operation 608 in which a total number of bit cells with logic "0" are received and counted by a popcount and compared to a total number of the plurality of bit cells in the PUF cell array, i.e., N, in accordance with various embodiments. If the total number of bit cells with logic "0" are smaller than N/2, the method 600 continues with operation 606 wherein a new sampling on a second sampling time is performed on the plurality of bit cells. If the total number of bit cells with logic "0" are equal to or greater than N/2, the method 600 continues with operation 610, wherein an N-bit binary symbol generated on the particular sampling time is output as a PUF signature. As discussed above in FIGS. 1-5, time needed to detect a flip of the logical state of a bit cell is determined by the total charge stored on the second dynamic node, total leakage current on the third NMOS transistor configured as a floating capacitor, a transfer curve of the second inverter, and the trigger point defined by the corresponding DFF circuit.

In an embodiment, a physical unclonable function (PUF) generator includes: a PUF cell array comprising a plurality of bit cells, wherein each of the plurality of bit cells comprises at least two inverters, at least one floating capacitor, at least two dynamic nodes, wherein the at least one floating capacitor is coupled between a first inverter at a first dynamic node and a second inverter at a second dynamic node; a PUF controller coupled to the PUF cell array, wherein the PUF controller is configured to charge the first dynamic nodes through the respective first inverters in the plurality of bit cells; and a finite state machine coupled to the PUF cell array configured to determine voltage levels on the second dynamic nodes through the respective second inverters in the plurality of bit cells to determine first logical states of the plurality of bit cells at a plurality of sampling times and generate a PUF signature.

In another embodiment, a method to configure a physical unclonable function (PUF) generator for generating a PUF signature, the method includes: pre-charging a first dynamic node to a first voltage through a first inverter in each of a plurality of bit cells in a PUF cell array; charging a second dynamic node through at least one floating capacitor in each of the plurality of bit cells in the PUF cell array; determining the voltage level on the second dynamic node through a second inverter in each of the plurality of bit cells in the PUF cell array at a plurality of sampling times; and generating a PUF signature.

Yet in another embodiment, physical unclonable function (PUF) generator for generating a PUF signature, the PUF generator includes: a PUF cell array comprising a plurality of bit cells, wherein each of the plurality of bit cells comprises at least two inverters, at least one floating capacitor, at least two dynamic nodes, wherein the at least one floating capacitor is coupled between a first inverter at a first dynamic node and a second inverter at a second dynamic node; a PUF controller coupled to the PUF cell array, wherein the PUF controller is configured to charge the first dynamic nodes through the respective first inverters in the plurality of bit cells; a plurality of dynamic flip-flop (DFF) circuits, wherein the plurality of DFF circuits is coupled to the plurality of bit cells respectively, wherein the plurality of DFF circuits is configured to determine a first logical states of the plurality of bit cells; a population count circuit coupled to the plurality of DFF circuits, wherein the population count circuit is configured to determine a first number of bit cells with logic states of 0 and a second number of bit cells with logic states of 1 in the plurality of bit cells at each of the plurality of sampling times; and an evaluation logic circuit coupled between the population count circuit and the plurality of DFF circuits, wherein the evaluation logic circuit is configured to compare the first and second number of bit cells at each of the plurality of sampling times to determine the PUF signature.

Although the disclosure has been described in terms of exemplary embodiments, it is not limited thereto. Rather, the appended claims should be construed broadly, to include other variants and embodiments of the disclosure, which may be made by those of ordinary skill in the art without departing from the scope and range of equivalents of the disclosure.

What is claimed is:

1. A physical unclonable function (PUF) generator comprising:
   a PUF cell array comprising a plurality of bit cells, wherein each of the plurality of bit cells comprises at least two inverters, at least one floating capacitor, and at least two dynamic nodes, wherein the at least one floating capacitor is coupled between a first inverter at a first dynamic node and a second inverter at a second dynamic node;
   a PUF controller coupled to the PUF cell array, wherein the PUF controller is configured to charge the first dynamic nodes through the respective first inverters in the plurality of bit cells; and
   a finite state machine coupled to the PUF cell array configured to determine voltage levels on the second dynamic nodes through the respective second inverters in the plurality of bit cells to determine first logical states of the plurality of bit cells at at least one sampling time and generate a PUF signature.

2. The PUF generator of claim 1, wherein the at least two inverters each comprises a first NMOS transistor and a first PMOS transistor.

3. The PUF generator of claim 1, wherein the at least one floating capacitor comprises a second NMOS transistor, wherein a gate terminal of the second NMOS transistor is coupled to the first dynamic node and drain, source and body terminals are coupled together to the second dynamic node.

4. The PUF generator of claim 1, wherein the floating capacitor further comprises a first channel dimension, wherein the first channel dimension is greater than second channel dimensions of the first NMOS and the first PMOS transistors in the at least two inverters, wherein the channel dimension comprises at least one of the following: a channel width and a channel length.

5. The PUF generator of claim 3, wherein the second NMOS transistor is manufactured in a first P-well, wherein the first P-well is manufactured in a first N-well in a p-type substrate.

6. The PUF generator of claim 2, wherein the first PMOS transistor in the at least two inverters of each of the plurality of bit cells is manufactured in a second N-well and the first NMOS transistor in the at least two inverters of each of the plurality of bit cells is manufactured directly in the p-type substrate.

7. The PUF generator of claim 1, wherein the finite state machine further comprises:
   a plurality of dynamic flip-flop (DFF) circuits wherein each of the plurality of DFF circuits is coupled to each of the plurality of bit cells respectively, wherein the plurality of DFF circuits is configured to determine the first logical states of the plurality of bit cells;
   a population count circuit coupled to the plurality of DFF circuits, wherein the population count circuit is configured to determine a first number of bit cells with logic states of 0 and a second number of bit cells with logic states of 1 at each of the at least one sampling time; and
   an evaluation logic circuit coupled between the population count circuit and the plurality of DFF circuits, wherein the evaluation logic circuit is configured to compare the first and second number of bit cells at each of the at least one sampling time to determine the PUF signature.

8. The PUF generator of claim 1, wherein the PUF signature comprises N bits of logic 0's and M bits of logic 1's, wherein M is not less than N.

9. A method to configure a physical unclonable function (PUF) generator for generating a PUF signature, the method comprising:
   pre-charging a first dynamic node to a first voltage through a first inverter in each of a plurality of bit cells in a PUF cell array;
   charging a second dynamic node through at least one floating capacitor in each of the plurality of bit cells in the PUF cell array;
   determining a voltage level on the second dynamic node through a second inverter in each of the plurality of bit cells in the PUF cell array at at least one sampling time; and
   generating a PUF signature.

10. The method of claim 9, wherein the first and second inverters each comprises a first NMOS transistor and a first PMOS transistor.

11. The method of claim 9, wherein the at least one floating capacitor comprises a second NMOS transistor, wherein a gate terminal of the second NMOS transistor is coupled to the first dynamic node and drain, source and body terminals are coupled together to the second dynamic node.

12. The method of claim 9, wherein the second NMOS transistor is manufactured in a first P-well, wherein the first P-well is manufactured in a first N-well in a p-type substrate.

13. The method of claim 10, wherein the first PMOS transistor in the at least two inverters of each of the plurality of bit cells is manufactured in a second N-well and the first NMOS transistor in the first and second inverters of each of the plurality of bit cells is manufactured directly in the p-type substrate.

14. The method of claim 9, wherein the determining further comprising:
   determining the first logical states of the plurality of bit cells using a plurality of DFF circuits; and
   determining a first number of bit cells with logic states of 0 and a second number of bit cells with logic states of 1 at each of the at least one sampling time using a population counter circuit.

15. The method of claim 14, wherein the plurality of DFF circuits is coupled to the plurality of bit cells, respectively.

16. The method of claim 9, wherein the PUF signature comprises N bits of logic 0's and M bits of logic 1's, wherein M is not less than N.

17. A physical unclonable function (PUF) generator for generating a PUF signature, the PUF generator comprising:
- a PUF cell array comprising a plurality of bit cells, wherein each of the plurality of bit cells comprises at least two inverters, at least one floating capacitor, at least two dynamic nodes, wherein the at least one floating capacitor is coupled between a first inverter at a first dynamic node and a second inverter at a second dynamic node;
- a PUF controller coupled to the PUF cell array, wherein the PUF controller is configured to charge the first dynamic nodes through the respective first inverters in the plurality of bit cells;
- a plurality of dynamic flip-flop (DFF) circuits, wherein the plurality of DFF circuits is coupled to the plurality of bit cells respectively, wherein the plurality of DFF circuits is configured to determine a first logical states of the plurality of bit cells;
- a population count circuit coupled to the plurality of DFF circuits, wherein the population count circuit is configured to determine a first number of bit cells with logic states of 0 and a second number of bit cells with logic states of 1 in the plurality of bit cells at each of the at least one sampling time; and
- an evaluation logic circuit coupled between the population count circuit and the plurality of DFF circuits, wherein the evaluation logic circuit is configured to compare the first and second number of bit cells at each of the at least one sampling time to determine the PUF signature.

18. The PUF generator of claim 17, wherein the at least two inverters each comprises a first NMOS transistor and a first PMOS transistor.

19. The PUF generator of claim 17, wherein the at least one floating capacitor comprises a second NMOS transistor, wherein a gate terminal of the second NMOS transistor is coupled to the first dynamic node and drain, source and body terminals are coupled together to the second dynamic node.

20. The PUF generator of claim 17, wherein the floating capacitor further comprises a first channel dimension, wherein the first channel dimension is greater than second channel dimensions of the first NMOS and the first PMOS transistors in the at least two inverters, wherein the channel dimension comprises at least one of the following: a channel width and a channel length.

* * * * *